United States Patent [19]

Sood

[11] 4,193,603
[45] Mar. 18, 1980

[54] SEALING SYSTEM FOR A TURBOMACHINE
[75] Inventor: Vijay K. Sood, Murrysville, Pa.
[73] Assignee: Carrier Corporation, Syracuse, N.Y.
[21] Appl. No.: 972,125
[22] Filed: Dec. 21, 1978
[51] Int. Cl.² .................................................. F16J 15/40
[52] U.S. Cl. .................................... 277/3; 277/15; 277/28; 277/53; 415/112
[58] Field of Search .................... 277/3, 15, 27, 28, 53; 415/110–112

[56] References Cited
U.S. PATENT DOCUMENTS

| 1,986,706 | 1/1935 | Beyer | 277/15 X |
| 3,414,274 | 12/1968 | Aronson | 277/15 |
| 3,533,635 | 10/1970 | Godin et al. | 277/3 |
| 3,604,206 | 9/1971 | Baily | 277/15 X |
| 3,906,730 | 9/1975 | Bellati et al. | 277/15 X |
| 3,909,012 | 9/1975 | Denis | 277/15 |

FOREIGN PATENT DOCUMENTS 275726  8/1927  United Kingdom ...................... 277/15

Primary Examiner—Robert S. Ward, Jr.
Attorney, Agent, or Firm—J. Raymond Curtin; Barry E. Deutsch

[57] ABSTRACT

A buffer fluid system for a turbomachine includes flow regulating means for regulating the quantity of buffer fluid flowing to a buffer fluid sealing region from an operating region receiving relatively high pressure fluid through a pressure reducing seal. The buffer system utilizes the leakage flow and vented flow is injected into the inlet of the machine.

12 Claims, 1 Drawing Figure

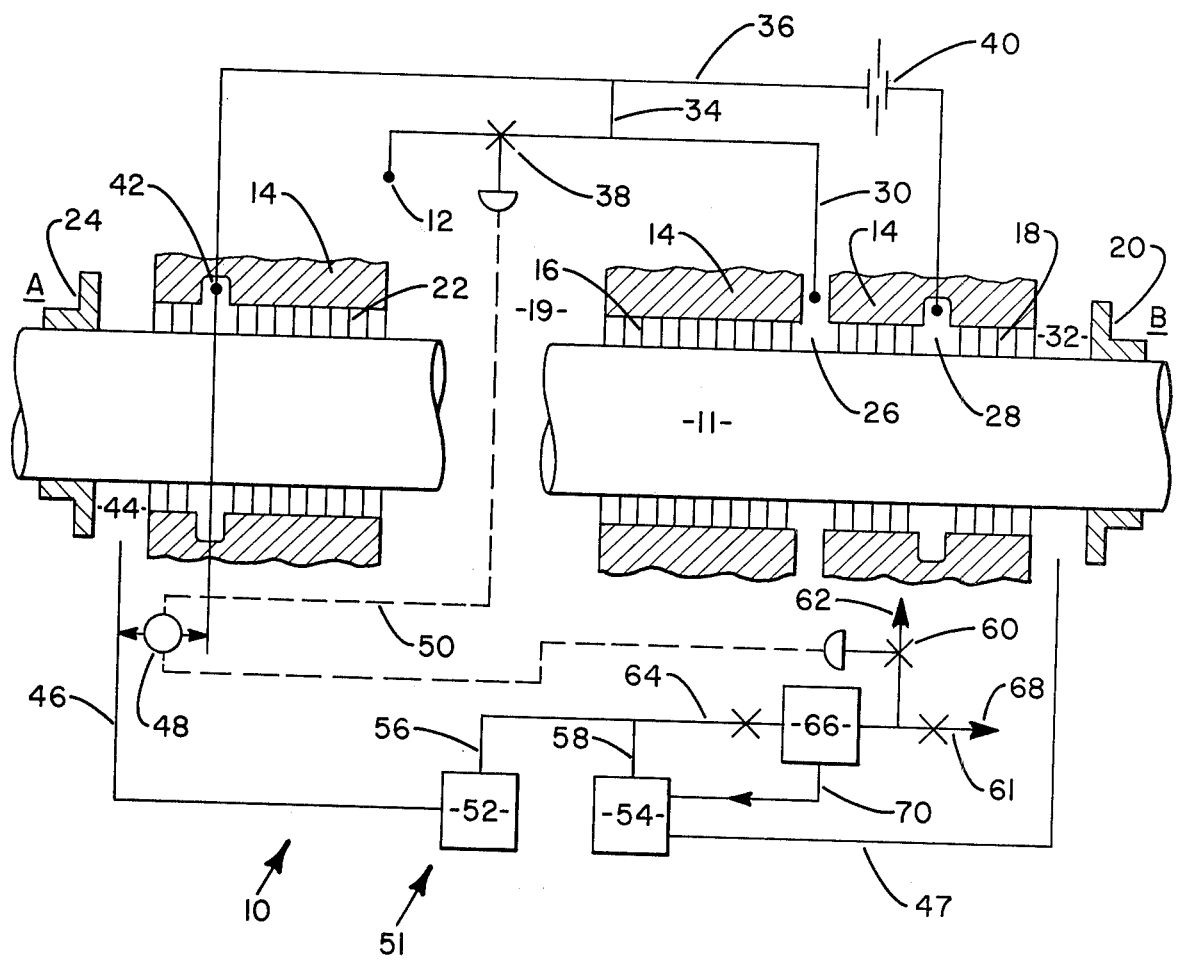

SEALING SYSTEM FOR A TURBOMACHINE

BACKGROUND OF THE INVENTION

This invention relates to a seal system for a turbomachine and in particular to an improvement in seal systems utilizing a buffer gas for keeping the process gas or working fluid isolated from the seal oil.

Typically, turbomachines such as centrifugal compressors, utilize a fluid, such as oil, at a pressure somewhat higher than the working pressure of the process gas or working fluid for sealing the working fluid within the machine and for preventing the flow of contaminants thereinto from the ambient. In many applications, it is a necessity that the seal oil be completely isolated from the working fluid to prevent contamination of the working fluid by the seal oil. To achieve this segregation of fluids, an outward flow of process fluid is maintained through the labyrinth seals. The outward flow of fluid is accomplished by either venting a small quantity of the process fluid to the atmosphere or through the use of a buffer gas or fluid. Typically buffer gas comprises a small portion of the process gas and is at a pressure somewhat higher than the pressure of the seal oil. The buffer gas is injected into the turbomachine at points intermediate the working fluid area and the seal fluid area to prevent the intermixing of the working and seal fluids.

It is desirable to maintain the pressure differential between the buffer fluid and the seal fluid at a relatively very low level to minimize the consumption of the buffer gas. However, even limited flow of buffer gas, when the source thereof is process fluid compressed by operation of the compressor, results in an overall decrease in the operating efficiency of the compressor, as the compressor performs work in increasing the pressure of the buffer gas, with this work not being recovered in the process or system. Thus, in order to increase efficiency of operation, it is desirable to utilize leakage fluid as a source of buffer fluid.

SUMMARY OF THE INVENTION

It is accordingly an object of this invention to utilize leakage fluid as a buffer fluid.

It is a further object of this invention to return leakage fluid employed as buffer fluid to the turbomachine's inlet for recompression in the process.

It is a further object of this invention to maintain a predetermined pressure differential between a buffer fluid sealing region and an operating region of the turbomachine.

It is a further object of this invention to automatically vary the flow of buffer fluid to a sealing region to maintain a predetermined pressure differential between the sealing region and an operating region of the turbomachine.

These and other objects of the present invention are attained in a seal system for a turbomachine and including a first relatively high pressure operating region. A first pressure reducing seal reduces the pressure of leakage fluid flowing from the high pressure operating region towards a second relatively low pressure region. A first conduit is in flow communication with the second region and a third region operating at a pressure somewhat lower than the pressure of the second region for conducting leakage fluid from the second region to the third region. A second conduit is in communication with the first conduit for transmitting a portion of the fluid flowing through the first conduit to a sealing region operating at a pressure intermediate the pressures of said second and third regions. The sealing region is disposed adjacent a fourth region operating at a pressure somewhat lower than the pressure of the sealing region. Flow regulating means controls the amount of fluid transmitted through the second conduit to the sealing region for maintaining the fluid pressure differential between the sealing region and the fourth operating region at a substantially predetermined magnitude.

BRIEF DESCRIPTION OF THE DRAWING

The single FIGURE of the drawings schematically illustrates a seal system for a turbomachine in accordance with the present invention.

DESCRIPTION OF THE PREFERRED EMBODIMENT

Referring now to the drawing, there is disclosed a preferred embodiment of the present invention. A seal system 10 is provided for a turbomachine such as a centrifugal compressor having a rotatable shaft 11. Circumferentially positioned about shaft 11 are a number of pressure reducing seals such as labyrinth 16, 18 and 22 for controlling the flow of leakage or seal fluid. The turbomachine further includes stator elements 14 suitably attached to the machine's casing (not shown). Also circumferentially surrounding shaft 11 and separating the working area of the compressor from the ambient are seals 20 and 24. The working or processed fluid is delivered into the turbomachine at main inlet or suction region 12.

In many applications, it is necessary to maintain complete separation between the process or working fluid and a seal fluid, generally seal oil, used to prevent flow of process fluid from the turbomachine. Typically, a buffer fluid obtained from the working fluid and elevated to a slightly higher pressure than the seal fluid is employed to prevent the mixing of the process and seal fluids. In the present invention, the buffer fluid is obtained from leakage fluid passing through a pressure reducing seal such as labyrinth seal 16 from the high pressure operating region of the turbomachine identified by reference numeral 19.

The leakage fluid flowing through seal 16 passes to a first operating region 26. A conduit 30 is in fluid flow communication with region 26, with the leakage fluid delivered into region 26 passing into conduit 30. Although the pressure of the fluid passing through seal 16 is reduced, the pressure is still at a relatively high level.

Conduit 30 is in communication with a conduit 34 and with suction region 12. Disposed in conduit 30 upstream from suction region 12 and downstream from the intersection of conduits 34 and 30 is flow regulating means 38, shown as a pressure operated valve. The function of valve 38 will be described more fully hereinafter.

Conduit 34 communicates with a third conduit 36 provided to deliver the leakage fluid to second and third operating regions 28 and 42. The seal fluid delivered into sealing region 42 flows in both directions along the shaft through a pressure reducing seal, such as labyrinth seal 22. The fluid delivered into sealing region 28 flows only in one direction along shaft 11, that is towards operating region 32 and seal 20.

Operating regions 32 and 44 are at substantially the same operating pressure. Seal fluid, such as seal oil, at a slightly higher pressure than the pressure of region 12, is injected into the turbomachine at regions A and B and a small quantity of seal oil leaks through seals 20 and 24 respectively towards regions 32 and 44. As noted previously, it is important that flow of buffer fluid towards regions 32 and 42 be maintained; accordingly the pressure at regions 32 and 42 is maintained higher than the seal oil pressure at regions A and B to prevent the seal fluid from gaining entrance into the working area of the turbomachine and contaminating the process fluid. The seal and buffer fluids intermix in regions 44 and 32. In communication with operating region 44 is a conduit 46 for passing the mixture of buffer and seal fluids from the region to drain means 51 for separating the seal fluid from the buffer fluid. Similarly, conduit 47 communicates region 32 with drain means 51. Drain means 51 comprises first and second fluid separators or drainers 52 and 54. Conduit 56 delivers the separated buffer fluid from separator 52 to intermix with the separated fluid flowing through conduit 58. Conduit 58 communicates with conduit 64. Conduit 64 terminates in a demister 66 which further eliminates any seal fluid still remaining in the buffer fluid. A valve 60 is disposed in conduit 61 downstream of demister 66. Valve 60 selectively directs the buffer fluid to the ambient through flare 62 or to the inlet or suction region 12 via conduit 68. The seal oil is returned to separator 54 via conduit 70.

A pressure sensing device 48 is in fluid flow communication with sealing region 42 and operating region 44. Device 48 senses the pressure differential between the two regions and provides a control signal, the magnitude of which is proportional to the sensed pressure differential between regions 42 and 44. The magnitude of the signal will vary in accordance with the sensed pressure differential between the two regions. Device 48 transmits the generated control signal to flow regulating means 38. Flow regulating means 38 operates to vary the quantity of buffer fluid directed through conduits 34 and 36 to sealing region 42 and thus bypassing suction 12 to maintain the predetermined pressure differential. The use of a valve and pressure sensing device 48 permits the seal system of the present invention to automatically maintain the desired buffer fluid flow in turbomachines operating at different conditions. The valve of flow regulating means 38 can be replaced by suitable orifices in conduits 30 and 34 in turbomachines operating at constant pressure conditions.

In operation, the leakage fluid accumulated in region 26 is directed through conduit 30, with a portion thereof flowing through conduits 34 and 36 to sealing regions 42 and 28 and the remaining portion thereof returning to the suction side 12 of the turbomachine. The pressure at sealing region 42 is approximately two to three p.s.i. greater than the pressure in operating region 44 to prevent the seal fluid injected at region A from flowing inwardly along shaft 11 towards low pressure region 12. Even though the pressure of the buffer fluid delivered to sealing regions 42 and 28 is reduced by operation of seal 16, the buffer fluid pressure still exceeds the operating pressure or regions 32 and 44. In turbomachines operating at varying pressure conditions, if the pressure of the leakage buffer fluid delivered through conduit 30, to conduits 34, 36 and eventually to regions 42 and 28 should increase so that the pressure differential between region 42 and 44 increases, device 48 senses the increased pressure differential and generates a signal opening valve 38 to increase the flow of fluid to suction side 12. Valve 38 will achieve a stabilized position once the predetermined pressure differential is obtained between regions 42 and 44. Likewise should the pressure differential decrease below the predetermined value, device 48 will deliver a control signal to flow regulating means 38 causing the valve to close to further increase that portion of the fluid flowing to region 42 and thus bypassing suction side 12 of the turbomachine.

The signal generated by device 48 is also delivered to valve 60. Valve 60 will open to direct flow of buffer fluid to the atmosphere via flare 62. Valve 60 will open when the pressure differential between sealing region 42 and operating region 44 decreses below a predetermined value, thus insuring that seal oil will not flow along shaft 11 to low pressure region 12, but rather, under such conditions, will flow through conduit 46 at an increased rate.

The arrangement herein disclosed provides a buffer fluid system which utilizes leakage fluid to establish the desired buffer seal region between an operating region having seal oil delivered thereto and a relatively low pressure process or working region in the turbomachine. By utilizing leakage fluid as the buffer fluid, substantially all loss of operating efficiency of the turbomachine has been eliminated. In addition, the present invention provides automatic control of the flow of buffer fluid to the sealing region in accordance with changes in the operating conditions of the turbomachine. Further, the greater portion of vented buffer fluid will be returned to the inlet or suction region of the machine for reuse in the process without increasing the horsepower required to recompress the gas.

While a preferred embodiment of the present invention has been described and illustrated the invention should not be limited thereto but may be otherwise embodied within the scope of the following claims.

What is claimed is:

1. A seal system for a turbomachine comprising:
    a first pressure reducing seal for reducing the pressure of a process fluid flowing therethrough;
    first conduit means for delivering a first portion of the fluid to a first relatively low pressure operating region;
    second conduit means for delivering a second portion of the fluid to a sealing region operating at a pressure somewhat higher than the pressure of the first operating region;
    a second pressure reducing seal in fluid flow communication with the sealing region and a second operating region having a pressure intermediate the sealing region and the first operating region; and
    flow regulating means for selectively regulating the flow of fluid between the sealing region and the first operating region to maintain the fluid pressure differential between the sealing region and the second operating region at a substantially predetermined magnitude.

2. A seal system in accordance with claim 1 further including:
    selectively operable flare means connected to said second operating region; and
    pressure sensing means for rendering such flare means operable if the magnitude of the pressure differential between the sealing region and second operating region decreases below a predetermined value.

3. A seal system in accordance with claims 1 or 2 wherein said flow regulating means includes:
    a valve to regulate the flow of fluid to said sealing region; and means for sensing the pressure differential between the sealing region and second operating region and for transmitting a signal to said valve for regulating the operation thereof to maintain said predetermined pressure differential.

4. A seal system in accordance with claim 1 further including third conduit means connected to said second operating region for delivering the fluid from said second operating region to the first operating region.

5. A seal system for a turbomachine comprising:
a first relatively high pressure operating region;
a first pressure reducing seal reducing the pressure of leakage fluid flowing from said high pressure operating region towards a second relatively low pressure region;
first conduit means in fluid flow communication with said second region and a third region operating at a pressure somewhat lower than the pressure of the second region for conducting leakage fluid from said second region to said third region;
second conduit means in communication with said first conduit means for transmitting a portion of the fluid flowing through said first conduit means to a sealing region operating at a pressure intermediate the pressures of said second and third regions and being disposed adjacent a fourth region operating at a pressure somewhat lower than the pressure of said sealing region; and
flow regulating means connected to said first and second conduit means for controlling the amount of fluid transmitted through said second conduit means to said sealing region.

6. A seal system in accordance with claim 5 further including:
pressure sensing means for sensing the operating pressure at the fourth operating region and for controlling the operation of said flow regulating means for regulating the flow of fluid transmitted through said second conduit means to said sealing region to maintain the fluid pressure differential between the sealing region and the fourth operating region at a substantially predetermined magnitude.

7. A seal system in accordance with claim 6 further including:
selectively operable flare means connected to said fourth operating region; and
pressure sensing means for rendering said flare means operable if the magnitude of the pressure differential between the sealing region and the fourth operating region decreases below a predetermined value.

8. A seal system in accordance with claim 5 further including third conduit means connected to said fourth operating region for delivering the fluid from said fourth operating region to said third operating region.

9. A seal system in accordance with claims 5 or 6 wherein said flow regulating means includes a valve for regulating the flow of fluid to said sealing region; and
said pressure sensing means transmits a signal to said valve for regulating the operation thereof to maintain said pressure differential at said predetermined value.

10. A method of sealing a compressor by utilizing leakage fluid as a buffering fluid comprising the steps of:
transmitting the buffering fluid to a first relatively low pressure operating region for mixing with the working fluid of the compressor;
bypassing a portion of the buffering fluid about the first low pressure operating region to a sealing region;
passing the fluid from the sealing region to a second region operating at a pressure intermediate the first and second regions;
sensing the pressure differential between said second and sealing regions; and
regulating the portion of fluid flowing to the sealing region to maintain the pressure differential at a substantially constant magnitude.

11. A method in accordance with claim 10 further including:
selectively placing the second region in fluid flow communication with the ambient; and
flaring the fluid from the second region to the ambient if the magnitude of the pressure differential decreases below a predetermined magnitude.

12. A method in accordance with claim 10 further including:
transmitting the fluid delivered to the second region to the first operating region.

* * * * *